United States Patent [19]

Dix, Jr.

[11] Patent Number: 5,053,768

[45] Date of Patent: Oct. 1, 1991

[54] GOLF CART CONTROL SYSTEM
[75] Inventor: Thomas S. Dix, Jr., Wayne, Pa.
[73] Assignee: Invisible Fence Company, Inc., Berwyn, Pa.
[21] Appl. No.: 455,566
[22] Filed: Dec. 21, 1989
[51] Int. Cl.⁵ .......................................... G08G 1/133
[52] U.S. Cl. ................... 340/988; 340/539; 340/323 R; 280/DIG. 5; 180/167; 275/32 R
[58] Field of Search .............. 340/435, 993, 988, 901, 340/539, 568, 571, 323 R, 825.36; 280/33.944, DIG. 5; 180/167, 271; 364/460; 273/32 R

[56] References Cited

U.S. PATENT DOCUMENTS

| | | |
|---|---|---|
| 2,023,950 | 12/1935 | Carter . |
| 2,131,291 | 9/1938 | Naust . |
| 2,741,224 | 4/1956 | Putnam . |
| 2,800,104 | 7/1957 | Cameron et al. . |
| 2,831,546 | 4/1958 | Henderson . |
| 2,836,253 | 5/1958 | Lovell . |
| 2,996,043 | 8/1961 | Pettingill . |
| 3,021,391 | 2/1962 | Wagenseil et al. . |
| 3,026,508 | 3/1962 | Muller . |
| 3,051,936 | 8/1962 | Finger et al. . |
| 3,076,058 | 1/1963 | Miller . |
| 3,105,120 | 9/1963 | Hanysz . |
| 3,110,891 | 11/1963 | Herrick et al. . |
| 3,128,840 | 4/1964 | Barrett, Jr. . |
| 3,150,321 | 9/1964 | Summers . |
| 3,157,871 | 11/1964 | Umanoff . |
| 3,162,726 | 12/1964 | Rosenberg et al. . |
| 3,168,729 | 2/1965 | Volberg . |
| 3,175,047 | 3/1965 | Borberg . |
| 3,192,507 | 6/1965 | Sudges . |
| 3,378,102 | 4/1968 | Collin et al. . |
| 3,407,895 | 10/1958 | Hasenbalg . |
| 3,472,333 | 10/1989 | Lowenstern, Jr. ................ 180/98 X |
| 3,570,227 | 3/1971 | Bellinger . |
| 3,580,353 | 5/1971 | Thompson . |
| 3,589,337 | 6/1971 | Doss . |
| 3,675,190 | 7/1972 | Auer, Jr. et al. . |
| 3,753,421 | 8/1973 | Peck ................................ 119/29 |
| 3,777,712 | 12/1973 | Gardner et al. . |
| 3,980,051 | 9/1976 | Fury . |
| 4,136,338 | 1/1979 | Antenore . |
| 4,208,658 | 6/1980 | Fujiki et al. . |
| 4,225,226 | 9/1980 | Davidson et al. . |
| 4,229,724 | 10/1980 | Marcus . |
| 4,242,668 | 12/1980 | Hergoz . |
| 4,297,684 | 10/1981 | Butter . |
| 4,371,934 | 2/1983 | Wahl et al. . |
| 4,463,906 | 8/1964 | Reinke et al. . |
| 4,480,310 | 10/1984 | Alvarez . |
| 4,619,231 | 10/1986 | Stolar et al. . |
| 4,656,476 | 4/1987 | Tavtigian ............................ 340/993 |
| 4,745,882 | 5/1988 | Yarnall, Sr. et al. . |
| 4,766,847 | 8/1988 | Venczel et al. . |
| 4,772,880 | 9/1988 | Goldstein et al. ................ 340/571 |
| 4,849,735 | 7/1989 | Kirtley et al. ...................... 340/539 |
| 4,926,161 | 8/1990 | Cupp ............................. 180/167 X |

FOREIGN PATENT DOCUMENTS

| | | |
|---|---|---|
| 3237927 | 4/1984 | Fed. Rep. of Germany . |
| 2455843 | 11/1980 | France . |

Primary Examiner—Donnie L. Crosland
Assistant Examiner—Brian R. Tumm
Attorney, Agent, or Firm—Dann, Dorfman, Herrell and Skillman

[57] ABSTRACT

A system and method are provided for controlling the movement of a golf cart relative to a selected restricted area on a golf course, such as a green. A signal transmitter having a transmitting antenna is positioned in the vicinity of the selected restricted area. A transmission signal is produced from the transmitting antenna at the selected restricted area. A signal receiver having a receiving antenna is positioned on the golf cart for receiving the transmission signal when the golf cart moves into the vicinity of the transmitting antenna. An alarm on the golf cart is activated when the transmission signal received by the receiving antenna reaches a predetermined level for indicating to an operator of the golf cart that the cart has moved into the restricted area on the golf course. The activation period of the first alarm is timed so that a second alarm on the golf cart can be activated after the expiration of a predetermined time period of activation of the first alarm. The second alarm provides notice to the cart operator that the cart has remained in the restricted area for the predetermined time period. The golf cart may also be disabled in the forward direction after a predetermined time period of activation of the first alarm to prevent further ingress of the cart into the restricted area.

39 Claims, 3 Drawing Sheets

GOLF CART CONTROL SYSTEM

FIELD OF THE INVENTION

The present invention relates to a golf cart control system and, more particularly, to a method and system for controlling the movement of a golf cart relative to a selected restricted area on a golf course by causing activation of an alarm on the golf cart to alert the cart operator that the cart has moved into the restricted area and by activating a second alarm and disabling the golf cart in the forward direction when the cart remains in the restricted area.

BACKGROUND OF THE INVENTION

Perhaps one of the greatest tasks in operating a golf course is maintaining the course in proper playing condition. Contributing to both the expense and the manpower required for the maintenance of the course is the almost constant need to repair damage to the course caused by the use of golf carts on areas of the course where usage is not permitted. Even during normal weather conditions, greens can be easily damaged by careless operators driving carts over the greens. The damage caused by even a single golf cart can often be quite extensive. During wet conditions, the damage becomes even more severe.

When golf carts are driven over restricted areas of the course, unnecessary expense and labor must be incurred to repair the resulting damage. In order to minimize such unnecessary expenditures, many golf courses presently employ signs and cart paths in effort to keep golf carts away from restricted areas. Unfortunately, signs and paths have not always proved to be entirely effective.

In accordance with Applicant's invention, a system and method is provided for electronically monitoring and controlling the movement of golf carts relative to selected restricted areas on the golf course. With Applicant's system, an alarm such as an indicator light is activated on the golf cart to alert the cart operator that the cart is entering into a restricted area. If the cart is not removed from the restricted area within a predetermined time limit, a second alarm, such as a horn, is activated to deter further movement of the cart into the restricted area. The system may also operate to disable the cart from movement in the forward direction if the alarm warning is disregarded.

SUMMARY OF THE INVENTION

In accordance with Applicant's invention, a system and method are provided for monitoring and controlling the movement of a golf cart relative to a selected restricted area on a golf course, such as one or more of the course greens. Applicant's system includes a signal transmitter having a transmitting antenna for placement in the vicinity of the selected restricted area on the golf course for producing a transmission signal at the restricted area. For this purpose, the transmitting antenna is operably positioned at a desired location at or near the restricted area. For example, the transmitting antenna may be in the form of a wire loop antenna which is dimensioned and positioned to surround the outer periphery of a selected restricted area such as a course green. Different areas on the golf course can be simultaneously protected by positioning separate transmitting antennas at each of such respective locations.

A signal receiver having a receiving antenna is positioned on each golf cart. Whenever a cart moves into the vicinity of the transmitting antenna, the transmission signal from the transmitting antenna is received by the signal receiver on such cart. The signal receiver functions to produce an activation signal whenever a selected parameter of the transmission signal received by the respective receiving antenna meets a selected condition such as the magnitude of the signal reaching a predetermined level.

A first alarm on the golf cart is activated by the activation signal for indicating to the operator that the golf cart has moved into a restricted area on the golf course. Different types of alarms will work satisfactorily. For example, the first alarm may be in the form of a visual alarm, such as an indicator light, for providing visual indication to the cart operator that the golf cart has moved into a selected restricted area. Alternatively, an audible alarm may be used as the first alarm.

A second alarm may also be used on the golf cart to provide indication to the cart operator that the golf cart has remained in the restricted area for a predetermined time period. For this purpose, activation of the second alarm is time delayed relative to the first alarm to provide the cart operator an opportunity to remove the cart from the restricted area. If the cart is removed in a timely manner, the second alarm is not activated. If, however, the cart is not removed within the predetermined time period following activation of the first alarm, the second alarm is then activated to deter further movement of the cart in the restricted area. In order to provide time-delayed activation of the second alarm, the system includes timer circuitry responsive to the activation signal for producing a trigger signal after a predetermined time period of the activation signal. The second alarm activates in response to the trigger signal to indicate that the golf cart has remained in the restricted area for the predetermined time period. The second alarm may be in the form of an audible alarm, such as a horn.

Either as an alternative or as a supplement to the second alarm, the system may include circuitry for disabling the cart in the forward direction whenever the cart remains in the restricted area for a predetermined time period following activation of the first alarm. For this purpose, the system includes cart interface switch circuitry responsive to a trigger signal from the timer circuitry for disabling the cart in the forward direction in response to the trigger signal to prevent forward movement of the cart in the restricted area.

A method is also provided for controlling the movement of a golf cart relative to the selected area on the golf course. For this purpose, a transmitting antenna is positioned at each restricted area on the golf course. A receiving antenna is positioned on each golf cart.

A transmission signal is produced by each transmitting antenna at each respective restricted area on the golf course. When a golf cart moves into the vicinity of one of the transmitting antennas at a selected restricted area, the transmission signal produced at the transmitting antenna is received at the receiving antenna positioned on the golf cart. A first alarm on the golf cart is activated in response to a selected parameter of the transmission signal received by the receiving antenna meeting a predetermined condition. The activation of the first alarm indicates to the cart operator that the golf cart has moved into a restricted area on the golf course. In a particular method of operation, the first alarm may be activated as a visual indication to the operator. Alternatively, the alarm may be activated as an audible indication.

A second alarm may also be activated in a time-delayed manner following activation of the first alarm to provide notice to the cart operator that the golf cart has remained in the restricted area for a predetermined time period. For this purpose, activation of the first alarm is timed. The second alarm is activated after a predetermined time period of activation of said first alarm to indicate that the golf cart has remained in the restricted area for the predetermined time period. Once again, either as a supplement or as an alternative to the second alarm, the cart may be disabled in the forward direction after a predetermined time period of activation of said first alarm to prevent further foward movement of the cart.

BRIEF DESCRIPTION OF THE DRAWINGS

The foregoing summary as well as the following detailed description of the preferred embodiments of the present invention will be better understood when read in conjunction with the appended drawings, in which.

DETAILED DESCRIPTION OF THE PREFERRED EMBODIMENTS

Figure 1:
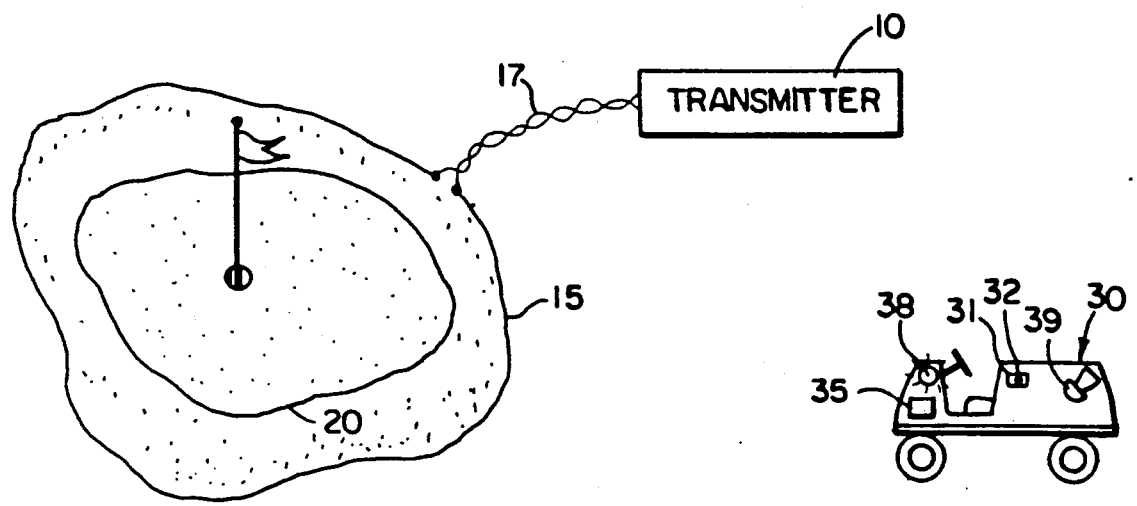
FIG. 1 is a schematic representation of a golf cart on a golf course employing the method and system of the present invention in which a transmitting antenna is positioned in the vicinity of a green and a signal receiver is positioned on the golf cart.

Referring to FIG. 1, a system for controlling the movement of a golf cart relative to a selected restricted area on a golf course is depicted. The system includes a signal transmitter 10 having a transmitting antenna 15 positioned in the vicinity of a selected restricted area such as a green 20. The transmitting antenna 15 is positioned on the golf course to produce a transmission signal at the restricted area 20.

A signal receiver 35 having a receiving antenna 33 is carried on each golf cart 30. An indicator lamp 38 and a horn 39 are also mounted on each cart 30.

Figure 2:
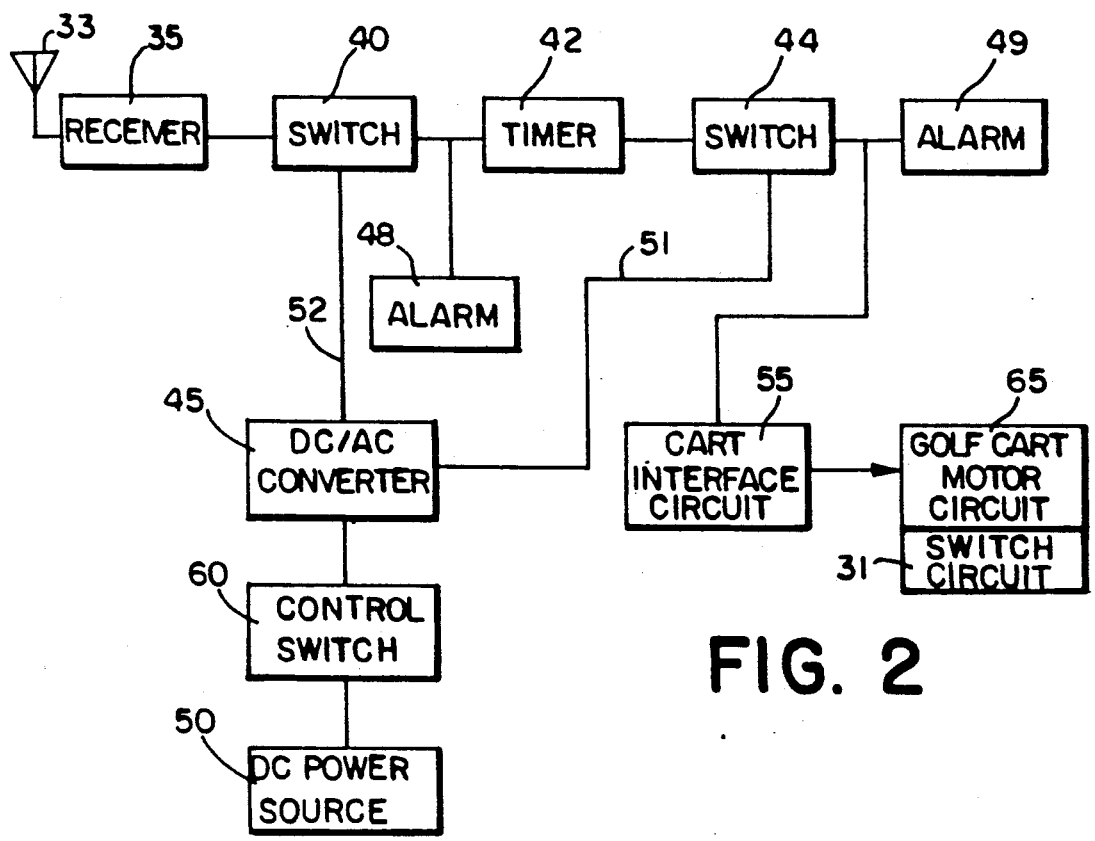
FIG. 2 is a schematic representation of the signal receiver and the circuitry employed in association with the signal receiver on the golf cart.
Figure 1A:
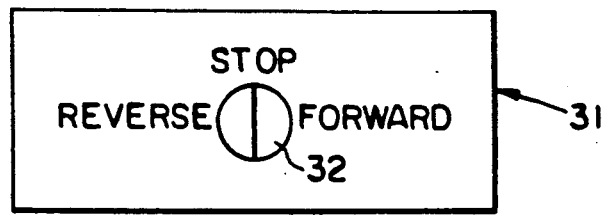
FIG. 1a is a schematic representation of a conventional golf cart starter-switch circuit having a conventional starter switch with forward, reverse and stop positions.

The golf cart 30 is conventional. The cart 30 is powered in a normal manner by either a gasoline motor or by electric storage batteries through a conventional motor circuit 65. The conventional golf cart motor circuit 65 for powering the cart is schematically represented in FIGS. 2 and 3. The golf cart 30 is also started and shut-off in a conventional manner by a conventional starter-switch circuit 31 employing a key-operated starter switch 32 connected with the golf cart motor circuit 65. As shown in FIG. 1a, the starter switch 32 can be set in the forward direction position, the reverse direction position, or the stop position. In conventional operation, when the starter switch 32 is set in the stop position, the golf cart is turned off. When the starter switch 32 is set in the forward position, the golf cart operates in the forward direction when the accelerator pedal of the cart is depressed. Similarly, when the switch 32 is set in the reverse position, the golf cart operates in the reverse direction when the accelerator pedal is depressed.

In general operation, when the golf cart approaches the vicinity of the green, the transmission signal produced by the antenna 15 is received by the receiving antenna 33 of the receiver 35 positioned on the golf cart. When a selected parameter of the transmission signal received by the receiver 35 meets a predetermined condition as the golf cart begins to enter the restricted area, a first alarm 48 on the cart is activated to indicate to the cart operator that the golf cart has moved into a restricted area on the golf course. In a preferred form of operation, the indicator lamp 38 is activated as the first alarm to provide a visual indication to the cart operator that the cart has moved into a restricted area. A second alarm 49 in the form of the horn 39 is thereafter activated to provide an audible alarm to the cart operator whenever the golf cart remains in the restricted area for a predetermined time limit following activation of the first alarm. In an alternative form of operation, the receiver 35 may also cooperate with the starter-switch circuit 31 to disable the cart in the forward direction whenever the cart remains in the restricted area beyond a predetermined time period following activation of the first alarm.

Considering the operation of the system circuitry in greater detail, the signal transmitter 10 is a conventional type of transmitter which is currently sold by the Invisible Fence Company, Inc. of Wayne, Pa., under Model No. CT-4000. The transmitter 10 operates to produce an AC signal for transmission by the transmitting antenna 15 in a sub-broadcast band of frequencies, such as approximately 10.75 Khz. Using a sub-broadcast band of frequencies for system operation reduces the possibility of system interference by other broadcast signals. The transmitter 10 is powered by a suitable power source such as a conventional 120 volt AC power source or by a rechargeable battery.

The transmitting antenna 15 is operatively connected with the signal transmitter 10 to produce a transmission signal in the vicinity of the green 20. As shown in FIG. 1, the transmitting antenna 15 is dimensioned and formed as a wire loop antenna and is positioned to surround the outer periphery of the restricted area such as the green 20. The wire loop transmitting antenna 15 may be buried beneath the ground to preserve the aesthetics of the golf course. The wire loop antenna 15 is connected to the transmitter 10 by lead wires 17 which are twisted together to prevent the generation of a transmission signal at the location of such leads. The lead wires 17 enable the transmitter 10 to be positioned at a selected location remote from the transmitting antenna 15. Additional restricted areas on the course can be simultaneously serviced by the transmitter 10. In order to protect more than a single green 20, additional transmitting antennas can be positioned at desired locations on the course and connected to the signal transmitter 10. If the load on the transmitter 10 becomes too large, additional transmitters can be employed.

The signal receiver 35 used on each golf cart may be in the form of a slightly modified version of a conventional receiver presently sold by the Invisible Fence Company, Inc. of Wayne, Pa., under Model No. R-5000. This conventional receiver can be easily modified for use in the present system by eliminating the electrical-shock generating circuitry connected to pins 1 and 6 of a timing circuit chip 4020 (not shown) of the receiver and by connecting pins 7 and 9 of the chip to external terminals on the conventional receiver to supply the signal produced at such external terminals as a pulsed output signal from the receiver. The signal receiver 35 operates at low power and is a suitable size to be carried on the golf cart. The signal receiver is powered by a DC power source 50 such as a small, portable dry-cell battery incorporated within the receiver. Alternatively, the receiver may be connected with the battery of the golf cart to supply necessary power for the operation of the receiver and the associated system circuitry as shown in FIGS. 2 and 3.

The antenna 33 for the receiver is of a conventional design and is mounted on the golf cart 30 in an operable orientation to ensure that an adequate signal is received by the receiving antenna when the golf cart moves into a desired vicinity of the transmitting antenna 15. The receiving antenna 33 may be a conventional single antenna or, alternatively, the receiving antenna 33 may include two or three separate antennas oriented in orthogonal directions to enhance signal reception. In basic form, however, the receiver is of the type that employs a single receiving antenna 33 and produces a pulsed output signal whenever the magnitude of the transmission signal received by the receiving antenna 33 reaches a predetermined level.

The pulsed output signal from the receiver 35 serves as an activation signal. As shown in FIG. 2, the output from the receiver 35 is supplied to a first switch circuit 40 which switchably connects the first alarm 48 with the DC power source 50. In operation, the first switch circuit 40 is normally open and is responsive to the activation signal output by the receiver 35 such that the first switch circuit closes in response to the pulsed activation signal. The activation signal thereby activates the first switch circuit to connect the first alarm 48 with the DC power source 50 causing activation of the first alarm 48.

In a preferred arrangement, the first switch circuit includes a silicon controlled rectifier (SCR). The SCR has its main terminals connected with the first alarm 48 and with the DC power source 50 through conductor 52. The anode of the SCR is connected with the power source 50 and the cathode of the SCR is connected with the first alarm 48. The output from receiver 35 is connected to the gate of the SCR. As such, the gate of the SCR is responsive to the activation signal produced by the receiver 35 to switch the SCR on. When switched on, the SCR enables the first alarm 48, such as indicator lamp 38, to be activated thereby indicating to the cart operator that the golf cart has moved into a restricted area on the golf course.

The distance from the green at which activation of the first alarm occurs may be varied. For example, the intensity of the signal produced in the transmitting antenna 15 can be increased or decreased. The receiver may also be adjusted so that activation of the first alarm 48 occurs when the transmission signal received at the receiving antenna reaches a different predetermined level. Alternatively, the transmitting antenna 15 may be buried either closer to or farther away from the green. As a result, activation of the first alarm 48 can be controlled. In a desired mode of operation, the first alarm 48 may be activated when the cart is a selected distance away from the transmitting antenna such as approximately 10-15 yards.

The second alarm 49, such as the golf cart horn 39, is activated when the golf cart remains in the restricted area for a predetermined time period following activation of the first alarm. In order to effect activation of the second alarm following the expiration of the predetermined time period, a first timer circuit 42 is employed. The input of the first timer circuit 42 is connected with the main terminal of the first switch circuit 40 which is connected with the first alarm 48. The output of the first timer circuit 42 is connected to the input of a second switch circuit 44. The first timer circuit 42 is configured to produce a time-delayed trigger signal at its output after a predetermined time period of receiving an input signal. Since the output from the first switch circuit 40 is supplied simultaneously as an input to both the first alarm 48 and the first timer circuit 42, the trigger signal which is output from the first timer circuitry is produced after a predetermined time period of activation of the first alarm 48. The first timer circuitry 42 is configured to enable the predetermined time period required for producing the output trigger signal to be adjustable. For example, the first timer circuitry may desirably include a conventional 555 timer.

The second switch circuit 44 serves to switchably connect the second alarm 49 with the DC power source 50. The second switch circuit 44 is normally off and is responsive to the trigger signal produced by the first timer circuitry 44 for switching on so as to connect the second alarm 49 with the DC power source 50 to cause activation of the second alarm 49.

The second switch circuitry 44 includes an SCR having one of its main terminals connected with the second alarm 49 and its other main terminal connected with the DC power source 50 through conductor 51. The anode of the SCR is connected with the power source 50 and the cathode is connected with the second alarm 49. The gate of the SCR is connected to the output of the first timer circuitry 42. As such, the gate of the SCR is responsive to the trigger signal output from the first timer circuit 42 to activate the second alarm 49 following the expiration of the predetermined time period of activation of said first alarm 48. The time-delayed activation of the second alarm 49 provides indication to the golf cart operator that the golf cart has remained in the restricted area for the predetermined time period following activation of the first alarm 48. In practical operation, if the cart operator ignores the activation of the first alarm 48, such as the indicator light 38, the activation of the second alarm, such as the horn 39, will soon follow. Activation of the horn provides audible indication to the cart operator that the cart has remained in the restricted area for the predetermined time period. The second alarm 49 thereby provides additional deterrance to the further ingress of the cart onto the restricted area.

In addition to the activation of the second alarm 49, the golf cart can also be automatically disabled in the forward direction whenever the golf cart remains in the restricted area for the predetermined time period. For this purpose, cart interface switch circuitry 55 is provided. The cart interface switch circuitry 55 is connected between the output of the second switch circuit 44 and the conventional golf cart motor circuitry 65 used for powering the golf cart in the forward and reverse directions in response to the position of the conventional starter switch 32. More specifically, the cart interface switch circuitry 55 incorporates a normally-closed kill switch which is inserted into the conventional forward-direction power circuitry of the conventional starter-switch circuit 31 of the golf cart. When the second switch circuit 44 is activated by the trigger signal output from the first timer circuit 42 so as to activate the second alarm 49, the kill switch of the cart interface switch circuitry 55 will simultaneously be switched off in order to interrupt or kill the forward-directional power of the golf cart. For a conventional gasoline powered golf cart, the engine ignition system in the forward direction will be disabled when the cart interface switch circuitry 55 is switched off. For an electric cart, the forward control solenoids will be disabled when the cart interface switch circuitry 55 is switched off. In both cases, however, operative power can be restored to the golf cart in the reverse direction by switching the golf cart starter switch 32 into the reverse position thereby enabling the golf cart operator to remove the golf cart from the restricted area in the reverse direction.

In order to disable the first and second alarms in the restricted area following activation, disablement circuitry is provided. For this purpose, a normally closed control switch 60 is connected between the DC power source 50 and the first and second switch circuits 40 and 44 as shown in FIG. 2. The control switch 60 is responsive to the position of the starter switch 32 of the golf cart. Whenever the starter switch 32 is switched to the reverse direction position, the control switch 60 is turned off to disconnect the DC power source 50. The control switch 60 thereby serves to disable the first and second alarms 48 and 49 when the starter switch 32 is set in the reverse position. When the control switch 60 is turned off in response to the starter switch 32 being set in the reverse direction position, the supply of power from the DC power source 50 to the first alarm 48 through the first switch circuit 40 is interrupted. The supply of such power to the second alarm 49 through the second switch circuit 44 is also interrupted. Finally, the supply of power to the cart interface switch circuitry 55 through the second switch circuit 44 is likewise interrupted. The interruption of such power causes the disablement of the first alarm 48, the second alarm 49, and the cart interface switch circuitry 55. Of course, in order to disable such circuitry in the restricted area, the cart can only be operated in the reverse direction.

The system also permits the first alarm 48, the second alarm 49, and the cart interface switch circuitry 55 to be automatically deactivated when the golf cart is removed from the restricted area so that the transmission signal received by the receiving antenna 33 drops below the predetermined level required for activation. For this purpose, deactivation circuitry is provided. A DC to AC converter 45 is connected between the DC power source 50 and the first switch circuit by conductor 52 and between the DC power source 50 and the second switch circuit 44 by conductor 51. The DC to AC converter 45 functions to convert the DC signal from the DC power source 50 to an AC signal for supply to the anodes of the SCRs respectively included within the first and second switch circuits 40 and 44. When the golf cart moves away from the restricted area so that the selected parameter, namely the magnitude, of the transmission signal received by the signal receiver 35 drops below the predetermined level and no longer meets the activation condition, the first and second switch circuits will remain "on" until the AC signal supplied on conductors 52 and 51 drops below the holding currents for the SCR switches thereby shutting off the SCR switches. When the SCR switches are turned off, the first and second alarms 48 and 49 and the cart interface switch circuit 55 automatically deactivate.

In practical operation, if the cart operator removes the golf cart from the restricted area following activation of the first alarm 48 but prior to activation of the second alarm 49, the first alarm will automatically be deactivated upon the removal of the cart. The timer circuitry 42 for the second alarm 49 will be reset. Likewise, if the cart operator removes the cart from the restricted area following activation of both the first and second alarms 48 and 49, both alarms will be automatically deactivated upon the removal of the cart from the restricted area. Again, the timer circuitry 42 will be reset.

Figure 2A:
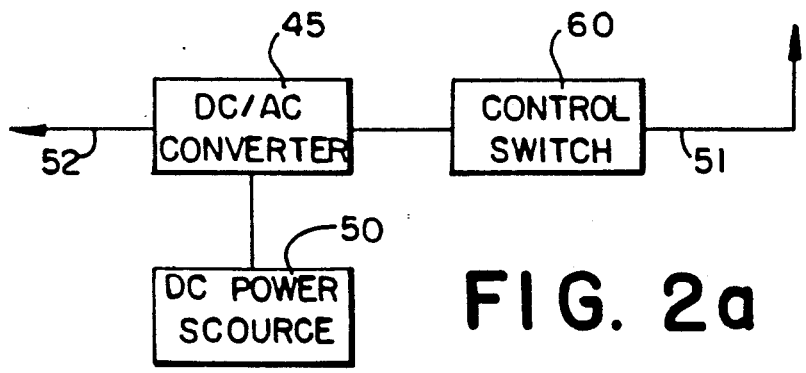
FIG. 2a is a schematic representation of an alternate circuit arrangement of a DC to AC converter, a control switch circuit, and a DC power source employed in the circuitry of FIG. 2.

In FIG. 2a, an alternate embodiment of the electrical connections between the DC to AC converter 45, the control switch 60, and the DC power source 50 is depicted. The alternate arrangement may be used in substitution for the connections of the DC to AC converter 45, the control switch 60 and the DC power source 50 shown in FIG. 2. By connecting the control switch 60 between the second switch circuit 44 and the DC power source 50, the second alarm 49 and the cart interface switch circuitry 55 will again be disabled when the starter switch 32 is set in the reverse position. However, the first switch circuit 44 and the first alarm 48 will not be affected. Consequently, the first alarm will remain "on" regardless of the position of the starter switch 32 and will only be automatically deactivated when the cart is removed from the restricted area.

An alternate embodiment of the circuitry for the entire system is depicted in FIG. 3. The embodiment shown in FIG. 3 is similar to the embodiment shown in FIG. 2, except that the cart interface switch circuit 55 is activated by a second timer circuit 46 through a third switch circuit 47.

As shown in FIG. 3, the input of the second timer circuit 46 is connected to the main terminal of the first switch circuit 40 to which the input of the first timer circuit 42 is connected. The output from the second timer circuit is connected to the third switch circuit 47. The second timer circuitry 46 provides a time-delayed output in response to the activation of the first switch circuit 40. The time period of the second timer circuit 46 is adjustable to permit an output to be produced in response to an input of a selected period of time. In a preferred arrangement, the second timer circuit 46 includes a conventional 555 timer. The second timer circuitry 46 is configured to produce as an output a time-delayed cart disabling trigger signal. The second timer circuit 46 produces such output after the expiration of a predetermined time period of activation of the first switch circuit 40 and therefore the first alarm 48.

The cart disabling trigger signal which is output by the second timer circuit 46 is supplied as an input to the third switch circuit 47. The third switch circuit 47 serves to switchably connect the cart interface switch circuit 55 with the DC power source 50 in response to the cart disabling trigger signal. The third switch circuit 47 is normally open. The third switch circuit 47 closes in response to the cart disabling trigger signal produced from the second timer circuit 46.

In a preferred arrangement, the third switch circuit 47 includes an SCR having one of its main terminals connected with the cart interface switch circuit 55 and the other main terminal connected with the DC power source 50 through conductor 61. The anode of the SCR is connected with the DC power source 50 and the cathode is connected with the cart interface switch circuit 55. The output from the second timer circuitry 46 is connected to the gate of the SCR. The gate of the SCR is responsive to the cart disabling trigger signal which is output by the second timer circuit 46 for electrically connecting the cart interface switch circuit 55 with the DC power source to open the cart interface switch circuit 55 to disable the cart in the forward direction.

In operation, when the cart moves into a restricted area, the activation of the first switch circuit 40 enables the second timer circuitry 46 to produce a time-delayed cart disabling trigger signal after the expiration of the predetermined time period set by the second timer circuit 46. The cart disabling trigger signal causes activation of the third switch circuit 47 to thereby enable the cart interface witch circuit 55 to disable the golf cart in the forward direction.

As shown in FIG. 3, the first timer circuit 42 is connected with the second alarm 49 while the second timer circuit 46 is connected with the cart interface switch circuit 55. As such, the second alarm 49 can be activated at a different time delay than the cart interface switch circuit 55. In practical operation, the first and second timer circuits 42 and 46 will be set to activate at different predetermined time periods. In a desired mode of operation, the first alarm 48 will activate when the cart moves into the restricted area. After a predetermined time period set by the first timer circuit 42, the second alarm 49 will then activate. Thereafter, upon the expiration of the predetermined time period set by the second timer circuit 46, the cart will be disabled from further movement in the forward direction by the cart interface switch circuitry 55.

Since the cart interface switch circuitry 55 is activated independently of the second alarm 49, an output from the DC to AC converter 45 is connected with the third switch circuit 47 by conductor 61. This enables automatic deactivation of the cart interface switch circuitry 55 when the cart is removed from the restricted area. The connection of the control switch 60 between the DC to AC converter 45 and the DC power source 50 permits the first alarm 48, the second alarm 49, and the cart interface switch circuitry 55 to be disabled when the starter switch 32 of the golf cart is set in the reverse position.

Figure 3A:
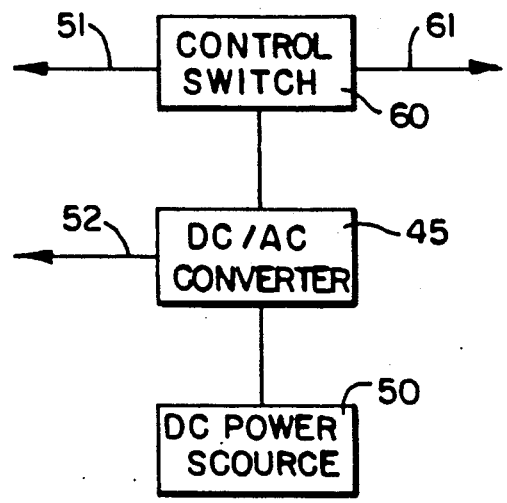
FIG. 3a is a schematic representation of an alternate circuit arrangement of a DC to AC converter, a control switch circuit, and a DC power source employed in the circuitry of FIG. 3.
Figure 3:
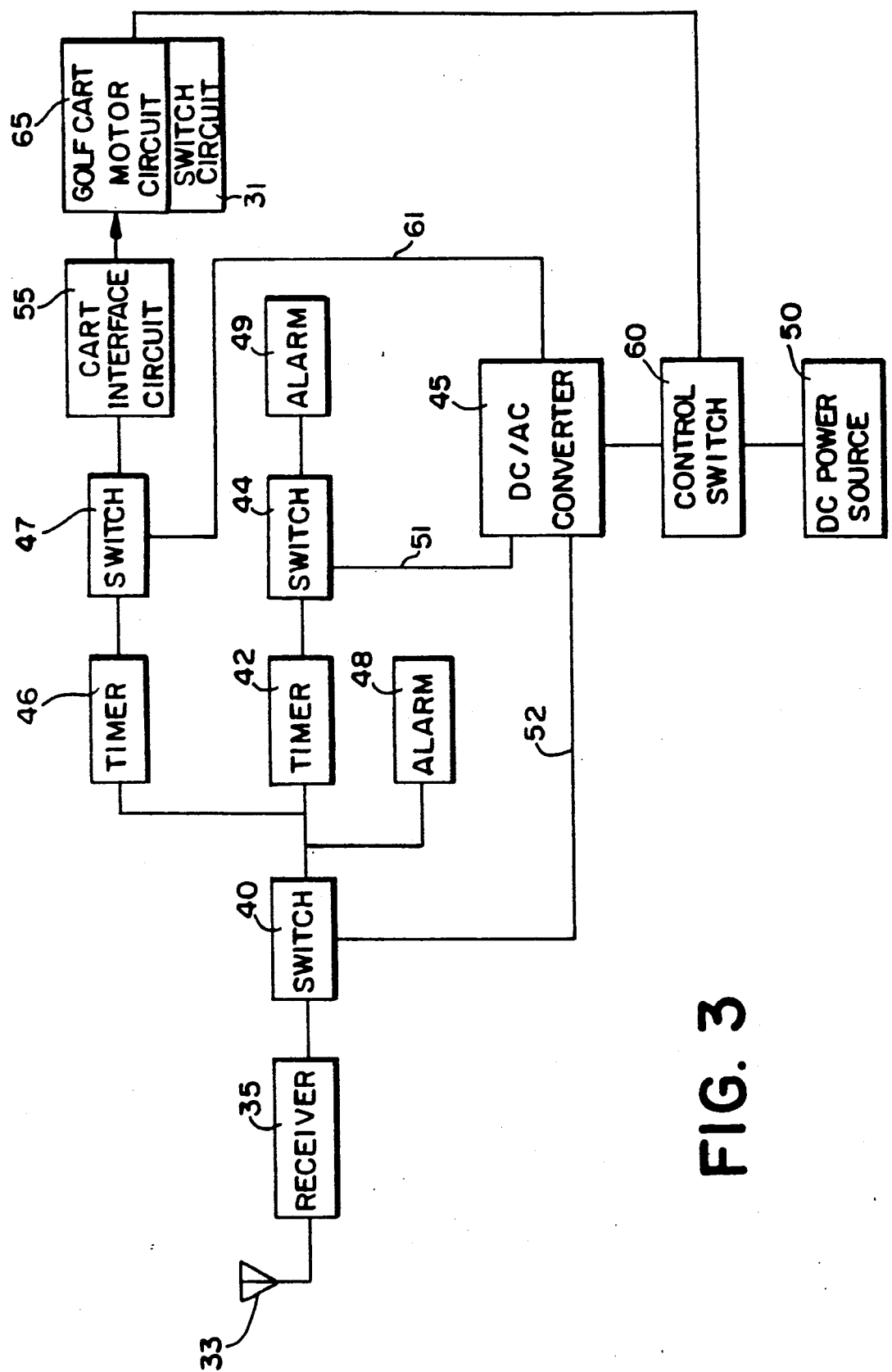
FIG. 3 is a schematic representation of an alternate embodiment of the signal receiver and the circuitry employed in association with the receiver on the golf cart.

In FIG. 3a, an alternate embodiment of the electrical connections of the control switch 60, the DC to AC converter 45, and the DC power source 50 is depicted. The alternate circuitry depicted in FIG. 3a is used in substitution for the connections of the DC to AC converter 45, the control switch 60, and the DC power source 50 shown in FIG. 3. As shown in FIG. 3a, the DC to AC converter 45 is connected between the DC power source 50 and the control switch 60. Conductor 52 from the anode of the SCR employed in the first switch circuit 40 is connected to one output of the DC to AC converter 45. Conductor 51 from the anode of the SCR used in the second switch circuit 44 and conductor 61 from the anode of the SCR used in the third switch circuit 47 are connected with the control switch 60. As such, when the starter switch 32 is set in the reverse position to open control switch 60, the second alarm 49 and the cart interface switch circuitry 55 are disabled. The first alarm 48, however, is not connected to the control switch 60 and will remain enabled regardless of the position of starter switch 32. The first alarm 48 is automatically deactivated when the cart is removed from the selected restricted area.

From the foregoing description, it can be seen that the present invention provides an effective method and system for controlling the movement of a golf cart relative to restricted areas on the golf course. It should be recogized by those skilled in the art that changes or modifications may be made to the above-described embodiments without departing from the broad inventive concept of the invention. Accordingly, it should be understood that the present invention is not limited to the particular embodiments disclosed herein, but is intended to cover all modifications and changes which are within the scope and spirit of the appended claims.

What is claimed is:

1. A system for controlling the movement of a golf cart relative to a selected restricted area on a golf course comprising:
   a. a signal transmitter having a transmitting antenna for placement in the vicinity of the selected restricted area o the golf course for producing a transmission signal at the restricted area;
   b. a signal receiver having a receiving antenna on the golf cart for receiving the transmission signal when the golf cart moves into the vicinity of the transmitting antenna, said signal receiver producing a desired activation signal when a selected parameter of the transmission signal received by the receiving antenna meets a predetermined condition;
   c. a first alarm on the golf cart activated by the activation signal for indicating to an operator of the golf cart that the golf cart has moved into the restricted area o the golf course;
   d. first timer circuitry responsive to the activation signal for producing a trigger signal after a predetermined time period of said activation signal;
   e. a second alarm on the golf cart responsive to the trigger signal for indicating that the golf cart has remained in the restricted area for the predetermined time period.

2. The system in accordance with claim 1 wherein the transmitter produces the transmission signal in a sub-broadcast band of frequencies.

3. The system in accordance with claim 1 wherein said transmitting antenna is dimensioned and positioned to surround the selected restricted area, said transmitting antenna being generally buried beneath the ground.

4. The system in accordance with claim 1 wherein said selected restrictive area includes a green.

5. The system in accordance with claim 1 wherein said first alarm comprises a visual alarm for providing visual indication that the golf cart has moved into the selected restricted area.

6. The system in accordance with claim 1 wherein said first alarm comprises an audible alarm for providing audible indication that the golf cart has moved into the selected restricted area.

7. The system in accordance with claim 1 comprising a power source and a switch circuit connected between the power source and the second alarm, the switch circuit being responsive to the trigger signal to enable activation of the second alarm.

8. The system in accordance with claim 7 wherein said power source comprises a DC power source and the switch circuit includes an SCR responsive to the trigger signal having main terminals connected between the second alarm and the DC power source and a gate responsive to the trigger signal, and wherein said system includes a DC to AC converter connected between the DC power source and one of the main terminals of the SCR.

9. The system in accordance with claim 1 wherein the system includes deactivation circuitry cooperating with said first alarm to automatically deactivate said first alarm when said golf cart is removed from the restricted area so that the selected parameter of the transmission signal received by the receiving antenna no longer meets the predetermined condition.

10. The system in accordance with claim 1 wherein the system includes deactivation circuitry cooperating with the second alarm to automatically deactivate said second alarm when said golf cart is removed from the restricted area so that the selected parameter of the transmission signal received by the receiving antenna no longer meets the predetermined condition.

11. The system in accordance with claim 1 wherein the golf cart is of the type having a golf cart starter-switch circuit with a forward direction and a reverse direction and wherein said system includes disablement circuitry responsive to the golf cart starter-switch circuit to disable the second alarm when the golf cart starter-switch circuit is set in the reverse direction.

12. The system in accordance with claim 1 wherein said second alarm comprises an audible alarm for providing audible indication that the golf cart has remained in the restricted area for the predetermined time period.

13. The system in accordance with claim 1 wherein said golf cart is of the type having a golf cart starter-switch circuit with a forward direction and a reverse direction and wherein said system includes cart interface switch circuitry connected with the golf cart starter-switch circuit for disabling the cart in the forward direction in response to the trigger signal to prevent forward movement of the cart.

14. The system in accordance with claim 1 wherein said golf cart is of the type having a golf cart starter-switch circuit with a forward direction and a reverse direction and wherein said system includes second timer circuitry responsive to the activation signal for producing a cart-disabling trigger signal after a second predetermined time period of said activation signal and cart interface switch circuitry connected with the golf cart starter-switch circuit for disabling the cart in the forward direction in response to the cart-disabling trigger signal to prevent forward movement of the cart.

15. The system in accordance with claim 14 comprising a power source and a switch circuit connected between the power source and the cart interface switch circuitry, the switch circuit being responsive to the cart-disabling trigger signal to enable the cart interface switch circuitry to disable the golf cart in the forward direction.

16. The system in accordance with claim 15 wherein said power source comprises a DC power source and the switch circuit includes an SCR responsive to the cart-disabling trigger signal having main terminals connected between the cart interface switch circuitry and the DC power source and a gate responsive to the cart-disabling trigger signal, and wherein said system includes a DC to AC converter connected between the DC power source and one of the main terminals of the SCR.

17. The system in accordance with claim 14 wherein said system includes deactivation circuitry cooperating with said cart interface switch circuitry to automatically deactivate the cart interface switch circuitry to enable the golf cart to move in the forward direction when the golf cart is removed from the restricted area so that the selected parameter of the transmission signal received by the receiving antenna no longer meets the predetermined condition.

18. A method for controlling the movement of a golf cart relative to a selected area on a golf course comprising:
 a. positioning a transmitting antenna at the restricted area on the golf course;
 b. positioning a receiving antenna on the golf cart;
 c. producing a transmission signal at the transmitting antenna positioned at the restricted area on the golf course;
 d. receiving the transmission signal at the receiving antenna positioned on the golf cart when the golf cart moves into the vicinity of the transmitting antenna at the selected restricted area;
 e. activating a first alarm to an operator of the golf cart in response to a selected parameter of the transmission signal received by the receiving antenna to indicate that the golf cart has moved into the restricted area on the golf course;
 f. timing the activation of said first alarm; and
 g. disabling the cart in the forward direction after a predetermined time period of activation of said first alarm to prevent forward movement of the cart.

19. The method in accordance with claim 18 including enabling the golf cart to again move in the forward direction once the golf cart has been removed from the restricted area in reverse direction.

20. A system for controlling the movement of a golf cart relative to a selected restricted area on a golf course comprising:
 a. a signal transmitter having a transmitting antenna for placement in the vicinity of the selected restricted area o the golf course for producing a transmission signal at the restricted area;
 b. a signal receiver having a receiving antenna on the golf cart for receiving the transmission signal when the golf cart moves into the vicinity of the transmitting antenna, said signal receiver producing a desired activation signal when a selected parameter of the transmission signal received by the receiving antenna meets a predetermined condition;
 c. a first alarm on the golf cart activated by the activation signal for indicating to an operator of the golf cart that the golf cart has moved into the restricted area on the golf course;
 d. a DC power source;
 e. a switch circuit connected between the power source and the first alarm, the switch circuit being responsive to the activation signal from the receiver to enable activation of the first alarm, the switch circuit including an SCR responsive to the activation signal, the SCR having main terminals connected between the first alarm and the DC power source and a gate responsive to the activation signal; and f. a DC to AC converter connected between the DC power source and one of the main terminals of the SCR.

21. A system for controlling the movement of a golf cart relative to a selected restricted area on a golf course, wherein the golf cart is of the type having a golf cart starter-switch circuit with a forward direction and a reverse direction, said system comprising:
   a. a signal transmitter having a transmitting antenna for placement in the vicinity of the selected restricted area on the golf course for producing a transmission signal at the restricted area;
   b. a signal receiver having a receiving antenna on the golf cart for receiving the transmission signal when the golf cart moves into the vicinity of the transmitting antenna;
   c. an alarm on the golf cart responsive to a selected parameter of the transmission signal received by the receiving antenna for indicating to an operator of the golf cart that the golf cart has moved into the restricted area on the golf course; and
   d. disablement circuitry responsive to the golf cart starter-switch circuit to disable the alarm when the golf cart starter-switch circuit is set in the reverse direction.

22. A system for controlling the movement of a golf cart relative to a selected restricted area on a golf course wherein said golf cart is of the type having a golf cart starter-switch circuit with a forward direction and a reverse direction, said system comprising:
   a. a signal transmitter having a transmitting antenna for placement in the vicinity of the selected restricted area on the golf curse for producing a transmission signal at the restricted area;
   b. a signal receiver having a receiving antenna on the golf cart for receiving the transmission signal when the golf cart moves into the vicinity of the transmitting antenna, said signal receiver producing a desired activation signal when a selected parameter of the transmission signal received by the receiving antenna meets a predetermined condition;
   c. a first alarm on the golf cart activated by the activation signal for indicating to an operator of the golf cart that the golf cart has moved into the restricted area on the golf course;
   d. first timer circuitry responsive to the activation signal for producing a trigger signal after a predetermined time period of said activation signal; and
   e. cart interface switch circuitry connected with the golf cart starter-switch circuit for disabling the cart in the forward direction in response to the trigger signal to prevent forward movement of the cart.

23. The system in accordance with claim 22 comprising a power source and a switch circuit connected between the power source and the cart interface switch circuitry, the switch circuit being responsive to the trigger signal to enable the cart interface switch circuitry to disable the golf cart in the forward direction.

24. The system in accordance with claim 23 wherein said power source comprises a DC power source and the switch circuit includes an SCR responsive to the trigger signal having main terminals connected between the cart interface switch circuitry and the DC power source and a gate responsive to the trigger signal, and wherein said system includes a DC to AC converter connected between the DC power source and one of the main terminals of the SCR.

25. The system in accordance with claim 22 wherein said system includes deactivation circuitry cooperating with said cart interface switch circuitry to automatically deactivate the cart interface switch circuitry to enable the golf cart to move in the forward direction when the golf cart is removed from the restricted area in the reverse direction so that the selected parameter of the transmission signal received by the receiving antenna no longer meets the predetermined condition.

26. The system in accordance with claim 22 wherein said system includes disablement circuitry responsive to the golf cart starter-switch circuit on the golf cart to disable the cart interface switch circuitry when the golf cart starter-switch circuit is set in the reverse direction.

27. A system for controlling the movement of a golf cart relative to a selected restricted area on a golf course, the golf cart having a forward direction of operation and a reverse direction of operation, the system comprising:
   a. a signal transmitter having a transmitting antenna for placement in the vicinity of the selected restricted area o the golf course for producing a transmission signal at the restricted area;
   b. a signal receiver having a receiving antenna on the golf cart for receiving the transmission signal when the golf cart moves into the vicinity of the transmitting antenna; and
   c. cart interface switch circuitry connected with the signal receiver for disabling the cart in the forward direction at the restricted area to prevent forward movement of the cart in response to a selected parameter of the transmission signal received by the receiving antenna, the cart interface switch circuitry permitting operation of the cart in the reverse direction when the cart is disabled in the forward direction at the restricted area so that the cart can be removed from the restricted area in the reverse direction.

28. A system for controlling the movement of a golf cart relative to a selected restricted area on a golf course comprising:
   a. a signal transmitter having a transmitting antenna for placement in the vicinity of the selected restricted area on the golf course for producing a transmission signal at the restricted area;
   b. a signal receiver having a receiving antenna on the golf cart for receiving the transmission signal when the golf cart moves into the vicinity of the transmitting antenna, the signal receiver being responsive to the transmission signal received by the receiving antenna for signalling when the cart moves into the restricted area;
   c. a time-delayed alarm on the golf cart responsive to the signalling by the signal receiver for indicating to an operator of the golf cart that the golf cart has remained in the restricted area on the golf course for a selected time period, the alarm being activated after the expiration of said selected time period; and
   d. a timer connected between the receiver and the alarm for timing the signalling from the signal receiver for the selected time period, said timer enabling time-delayed activation of the alarm upon expiration of the selected time period.

29. A method for controlling the movement of a golf cart relative to a selected area on a golf course, the golf cart having a forward direction of operation and a reverse direction of operation, the method comprising:

a. positioning a transmitting antenna at the restricted area on the golf course;
b. positioning a receiving antenna on the golf cart;
c. producing a transmission signal at the transmitting antenna positioned at the restricted area on the golf course;
d. receiving the transmission signal at the receiving antenna positioned on the golf cart when the golf cart moves into the vicinity of the transmitting antenna at the selected restricted area;
e. disabling the cart in the forward direction in response to a selected parameter of the transmission signal received by the receiving antenna to prevent further forward movement of the cart at the selected restricted area; and
f. enabling operation of the cart in the reverse direction when the cart is disabled in the forward direction at the restricted area so that the cart can be removed from the restricted area in the reverse direction.

30. A method for controlling the movement of a golf cart relative to a selected area on a golf course comprising:
a. positioning a transmitting antenna at the restricted area on the golf course;
b. positioning a receiving antenna on the golf cart;
c. producing a transmission signal at the transmitting antenna positioned at the restricted area on the golf course;
d. receiving the transmission signal at the receiving antenna positioned on the golf cart when the golf cart moves into the vicinity of the transmitting antenna at the selected restricted area;
e. producing a desired activation signal on the golf cart when the transmission signal received by the receiving antenna reaches a predetermined level;
f. timing the activation signal for a predetermined time period;
g. enabling adjustment to the predetermined time period so that the predetermined time period may be adjustably set for different selected amounts of time;
h. producing a trigger signal after an adjustable time delay provided when the activation signal reaches the adjustably set predetermined time period; and
i. providing an alarm to an operator of the golf cart in response to the trigger signal to indicate that the golf cart has remained in the restricted area on the golf course for the adjustably set predetermined time period.

31. A method for controlling the movement of a golf cart relative to a selected area on a golf course comprising:
a. positioning a transmitting antenna at the restricted area on the golf course;
b. positioning a receiving antenna on the golf cart;
c. producing a transmission signal at the transmitting antenna positioned at the restricted area on the golf course;
d. receiving the transmission signal at the receiving antenna positioned on the golf cart when the golf cart moves into the vicinity of the transmitting antenna at the selected restricted area;
e. activating a first alarm to an operator of the golf cart in response to a selected parameter of the transmission signal received by the receiving antenna to indicate that the golf cart has moved into the restricted area on the golf course;
f. timing the activation of said first alarm; and
activating a second alarm to the operator after a predetermined time period of activation of said first alarm to indicate that the golf cart has remained in the restricted area for the predetermined time period.

32. The method in accordance with claim 31 wherein the transmission signal is produced in a sub-broadcast band of frequencies.

33. The method in accordance with claim 31 wherein said first alarm is activated as a visual indication to the operator that the golf cart has moved into the restricted area.

34. The method in accordance with claim 31 wherein said first alarm is activated as an audible indication to the operator that the golf cart has moved into the restricted area.

35. The method in accordance with claim 31 including deactivating said first alarm when the golf cart is removed from the restricted area.

36. The method in accordance with claim 31 including disabling the cart in the forward direction after a second predetermined time period of activation of said first alarm to prevent forward movement of the cart.

37. The method in accordance with claim 31 wherein said second alarm is activated as an audible alarm.

38. The method in accordance with claim 31 including disabling the cart in the forward direction after the predetermined time period of activation of said first alarm to prevent forward movement of the cart.

39. The method in accordance with claim 31 including deactivating said second alarm when said golf cart is removed from the restricted area.

* * * * *